May 29, 1951     H. E. McKINNEY     2,555,145
LUBRICATOR DEVICE
Filed March 29, 1949

Inventor:
H. E. McKinney
By [signature]
His Attorney

Patented May 29, 1951

2,555,145

UNITED STATES PATENT OFFICE 2,555,145

LUBRICATOR DEVICE

Howard E. McKinney, Houston, Tex., assignor to Shell Development Company, San Francisco, Calif., a corporation of Delaware Application March 29, 1949, Serial No. 84,076

5 Claims. (Cl. 254—29)

This invention relates to an apparatus for inserting strings of relatively flexible elongated cylindrical or tubular elements, such as tubing cables, wire lines, etc., into high pressure vessels or zones.

Since the present invention is especially well suited for inserting cables or strings of small diameter flexible tubing into high pressure wells, it will be described herein in its application to this particular type of operation, the closed well casing being considered as a pressure vessel. It is, however, understood that the invention is in no way limited thereto, but may also be used for inserting temperature and pressure bulbs, or similar instruments, into pressure vessels such, for example, as towers in oil refineries, etc. Furthermore, by suitably enlarging or modifying the various component parts of the present system, said system can be readily adapted, without department from its principle, for the handling of any type of production tubing including that of relatively large diameter, as in snubbing operations, etc.

Since wire lines and cables of types such as are used in well head operations, for example, insulated conductor cables having an armor sheath made of wire strands, have a relatively rough or uneven surface, an excessive radial pressure must be applied by any lubricator or packing element when such cable is being inserted into a high pressure well to prevent pressure leaks between the packing element and the cable. In fact, before a completely fluid-tight seal is formed about the cable, this radial pressure must often reach such an order of magnitude that the cable becomes jammed in the packer, thus preventing a vertical movement of the cable and defeating the purpose of operation of the lubricator.

Likewise, since small diameter flexible tubing has relatively thin walls, it is extremely difficult to insert it through a pressure packing without bending the tubing, which weakens its walls and makes it unsuitable for further use.

It is therefore a primary object of this invention to provide an apparatus for readily inserting cable, wire line, tubing, or equivalent elongated cylindrical elements, into high-pressure zones and removing said elements therefrom.

It is also an object of the present invention to provide a tubing inserting mechanism having gripping elements adapted to grip a flexible string without injuring said string during the insertion into or removal from a high-pressure zone.

A further object of the present invention is to provide a lubricator for handling a string or columnar element, said lubricator comprising stationary and movable pressure seals that are alternately opened when the tubing is passed therethrough and closed when said tubing is positioned therein in a stationary manner.

Other objects and advantages of the invention will become apparent from the following description taken with reference to the drawing wherein.

Figures 1, 2:
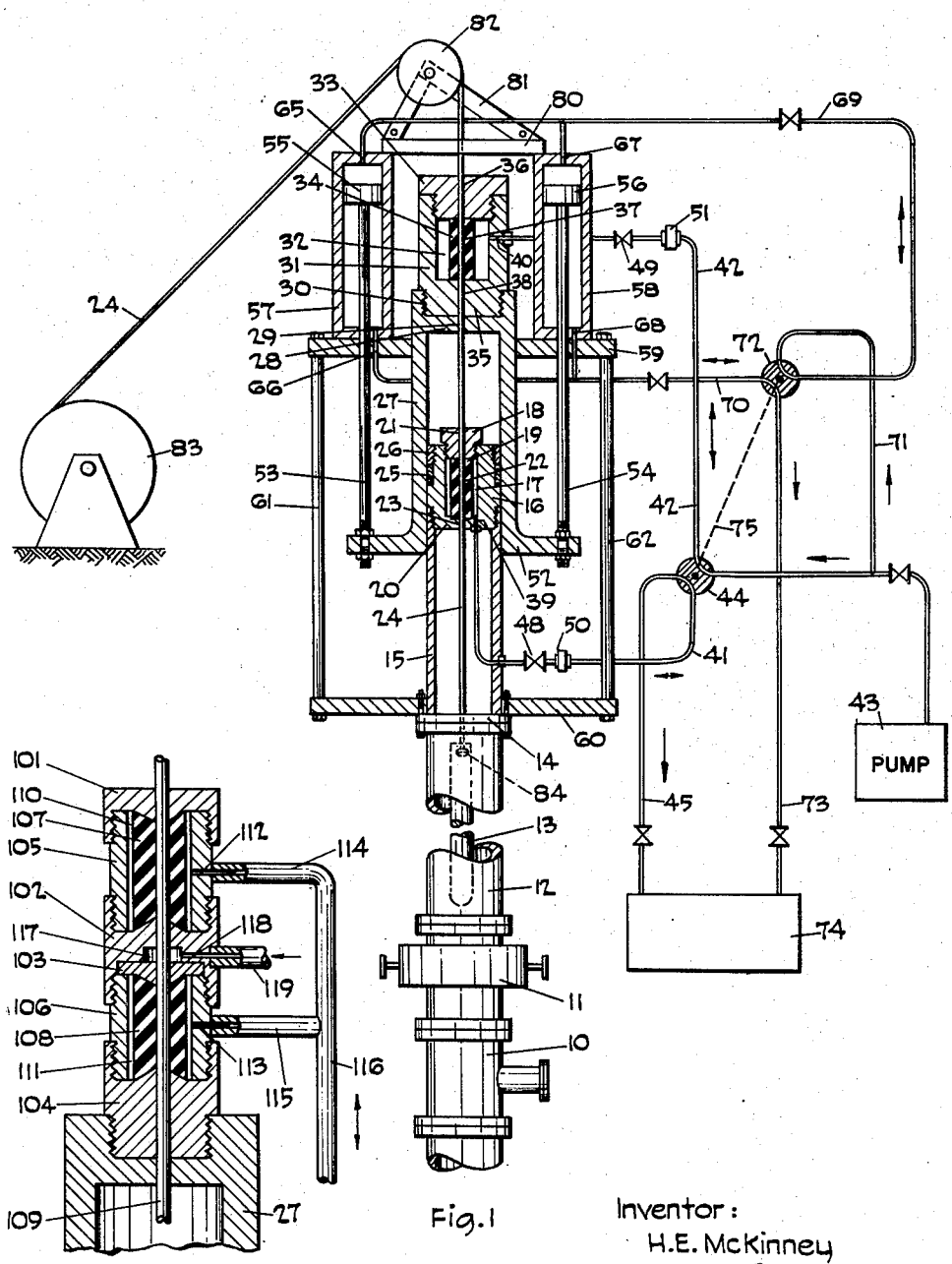
Figure 1 is a diagrammatic view of an embodiment of the present tubing inserting mechanism mounted for operation at a well head.
Figure 2 is a cross-sectional view of a gripping element used in the present apparatus.

Referring to Figure 1 the present apparatus is shown as mounted on the top member 10 of a "Christmas tree" of a high-pressure well casing head installation. A blow-out preventer 11 or other valve means may be flanged or affixed in any suitable manner to the member 10. Preferably, a spool piece 12 is secured in a fluid-tight manner to the top of the blow-out preventer 11, said spool piece 12 being of a length sufficient to accommodate a sinker bar 13 adapted to be positioned therein for purposes to be described hereinbelow.

Secured in any suitable manner, as by flange means 14 to the spool piece 12, and coaxially with said spool piece 12 and the well casing (not shown), is a hollow standing plunger element comprising a tubular member 15 closed at its upper end in a substantially fluid-tight manner by closure means comprising a plug or sealing member 16 having a longitudinal chamber 17 therein. The open upper end of chamber 17 is normally closed in a fluid-tight manner by a removable bushing or plug 18.

Positioned within the chamber 17 is a resilient gripping and packing element 19 which is preferably cylindrical in shape and is of a smaller diameter than the diameter of the chamber 17, whereby an annular space is formed between the wall of said chamber 17 and said packing element 19. The length of said packing element 19 is such that it is normally positioned in a fluid-tight manner within the chamber 17 between the removable bushing 18 and the closed end 20 of the sealing member 16. Drilled through or formed in said bushing 18, said packing element 19 and the closed lower end 20 of said plug 16, are co-axial longitudinal bores 21, 22 and 23, respectively. The bores 21, 22 and 23 have a diameter at least as large as a tubing or cable 24 to be slidingly forced therethrough.

A portion of the outer surface of the longitudinal plug 16 is recessed to contain therein a ring of suitable packing material 25 that is held in place by any suitable means, as by a holding ring 26. The packing ring 25 forms a fluid-tight seal between the sealing member 16 at the top of the stationary plunger and a surrounding barrel member 27 which is mounted for sliding reciprocating movement about said sealing member 16 and tubular member 15.

The traveling barrel 27 has an open lower end and a closed upper end 28, said upper end 28 having an axial bore 29 therethrough to accommodate the cable or tubing 24 to be inserted into the well. Fixedly secured, as by screw threads 30, on the top of said traveling barrel 27 is a housing or second sealing member 31 having a chamber 32 formed therein, said chamber 32 being normally closed at the top by a removable cover 33. A resilient gripping and packing element 34, is positioned in said chamber 32, said packing element being similar in size and construction to packing element 19 whereby an annular space is formed between said sealing element 34 and the wall of said chamber 32.

The packing or gripping elements 19 and 34 are preferably made of synthetic rubber but may be made of rubber, rubberized canvas or any resilient plastic material. Passing through the cover 33, gripping element 34 and housing 31 are longitudinal bores 36, 37 and 38, respectively, said bores being in alignment with bores 21, 22, 23 and 29.

Plug 16 and housing 31 are equipped with suitable fluid inlets 39 and 40, respectively, by which a pressure fluid may be introduced into chambers 17 and 32 for compressing gripping elements 19 and 34, respectively, around the tubing 24. Fluid pressure conduits 41 and 42 are in communication between the fluid inlets 39 and 40 and any suitable source of fluid pressure, such as a pump 43, or a pressure fluid reservoir for supplying fluid at pressures greater or less than those encountered in well casings as needed to cause elements 34 and 19 to grip properly. Suitable valve means may be installed in the conduits 41 and 42 whereby fluid pressure may be alternately supplied by said pump 43 to chamber 17 and chamber 32. As pressure is being supplied to one chamber, pressure in the other chamber is relieved. A two-way valve 44 is diagrammatically shown in Figure 1 as connecting the pump 43 to conduit 42 whereby a pressure fluid, such as water, oil, glycerine, grease, or the like, is introduced into chamber 32. The oil line 42 should be flexible in order to follow the reciprocations of housing 31. At the same time the pressure fluid in chamber 17 is exhausted through conduit 41 and valve 44 at the exhaust outlet 45. If desired the outlet 45 may lead back to the pressure fluid reservoir or pump 43. It will be seen that by turning valve 44 through 90 degrees, the pump 43 will be in communication with conduit 41 while conduit 42 is in communication with the exhaust conduit 45. Conduits 41 and 42 may also be equipped with normally open shut-off valves 48 and 49 and couplings 50 and 51, respectively, to facilitate the removal of the pressure fluid supply system when the tubing inserting mechanism is moved to another well.

Any suitable prime mover means may be utilized to reciprocate the traveling barrel member 27 on the stationary plunger comprising members 15 and 16. In this embodiment a flange 52 on the lower end of barrel 27 is bolted to the ends of a pair of piston rods 53 and 54 having pistons 55 and 56 secured at the other ends of said rods and mounted for vertical reciprocating movement within a pair of cylinders or piston housings 57 and 58. The cylinders 57 and 58 are fixedly secured, as by welding, to a suitable base or framework comprising horizontal members 59 and 60 and vertical members 61 and 62. While this framework may be of sufficient size to position it on the ground or platform (not shown) adjacent the well, it is preferably secured in a rigid manner directly to the well head, as by bolting horizontal member 60 to flange 14.

The piston cylinders 57 and 58 are connected by suitable valve and conduit means to a source of pressure fluid to form reciprocating prime mover means. The cylinders 57 and 58 are equipped with fluid ports 65 and 66, 67 and 68, respectively, which alternately communicate with pump 43 through conduits 69, 70 and 71. Conduits 69 and 70 may communicate, one at a time, with conduit 71 through suitable valve means, such as a two-way valve 72. As shown in Figure 1, conduits 69 and 71 are in communication and conduit 70 is closed whereby pressure fluid may be supplied to cylinders 57 and 58 through fluid ports 65 and 67; with valve 72 turned 90 degrees in either direction conduits 70 and 71 are in communication and fluid pressure enters the cylinders 57 and 58 through fluid ports 66 and 68. At the same time ports 65 and 67 serve as fluid outlets from cylinders 57 and 58, respectively, whereby fluid may be exhausted from said cylinders through conduit 69 and valve 72 and thence through conduit 73 to the exhaust reservoir 74.

Mounted atop the cylinder housings 57 and 58 is a plate 80 and bracket 81 for mounting a guide sheave 82 which may be employed to facilitate the alignment of flexible tubing 24 so that it may be readily fed into the gripping elements 34 and 19 of the apparatus. The tubing or cable 24 may be stored and handled in any suitable manner, as on a drum 83.

In operation the present tubing inserting apparatus is mounted on a well head in the manner illustrated in Figure 1 with the sinker bar 13 secured to the lower open end of the tubing 24 by any connecting means 84 well known to the art. The valve or blow-out preventer 11 may then be opened to allow the sinker bar 13 and tubing 24 to pass therethrough into the high-pressure well. At the same time pressure pump 43 is started so that pressure fluid is applied simultaneously to one of the gripping elements 19 and 34 and to one side of the pistons 55 and 56.

With the pistons 55 and 56 positioned at the top of the cylinders 57 and 58, the valves 44 and 72 are set as shown, with valve 44 having been opened to conduit 42 at the same time or preferably a short time before valve 72 was opened to conduit 69. Thus, pressure fluid first enters the pressure chamber 32 compressing the packer 34 so that it grips the tubing 24 and seals against the cover 33 and the closed end 35 of the housing 31. At the same time the pressure fluid in chamber 17 is allowed to exhaust through conduits 41 and 45 and valve 44 to remove any pressure from gripping element 19.

Thus, when pressure fluid is applied by pump 43 through conduits 71 and 69 and through fluid inlets 65 and 67 into the cylinders 57 and 58 above the pistons 55 and 56, said pistons are forced downwardly at the same time causing any pressure fluid below said pistons to be exhausted through ports 66 and 68 and conduits 70 and 73 into the reservoir 74. As the pistons 55 and 56 move down, the attached piston rods 53 and 54, flange 52, traveling barrel 27 and housing 31 containing the actuated or set gripping element 34 are also moved down, carrying tubing 24 with it, whereby said tubing is forced through gripping element 19 into the high-pressure well casing.

When the pistons 55 and 56 and the traveling barrel 27 reach the end of their downstroke, valve 44 is turned 90 degrees so that pressure fluid is applied through valve 44 and conduit 41 to chamber 17 to compress packer or gripping element 19 around the tubing 24 and against the cover 18 and the closed end 29, thus suspending the tubing 24 in the well casing and preventing the casing pressure from escaping. Valve 72 is also turned 90 degrees so that fluid pressure is supplied by pump 43 through conduits 71 and 70 and inlets 66 and 68, to force pistons 55 and 56 upwards. Traveling barrel 27 and housing 31 move upward with said pistons, the gripping element 34 passing freely along said tubing since the pressure in chamber 32 has been exhausted through conduit 42, valve 44 and conduit 45.

The above-described operations are repeated until the desired length of tubing 24 has been inserted in the well casing. It is obvious that control valves 44 and 72 may be linked to, and operated by, any suitable mechanical, electrical or hydraulic control mechanism (as represented by broken line 75) whereby said valves may be repeatedly actuated or set to perform the above operations. Before removing the major portion of the tubing inserting apparatus from the well head, pressure fluid may be applied to chamber 17 to seal the gripping element 19 within said plug 16. Valve 48 is then closed to maintain pressure on the packer 19 and the conduit 41 is uncoupled at 50. This leaves the standing plunger, comprising member 15 and plug 16, to seal the top of the well installation with tubing 24 extending through said plug whereby a corrosion inhibitor fluid may be introduced into said well through said tubing.

It is evident that other embodiments of the present apparatus may employ other prime mover means for reciprocating the traveling barrel 27, other sources of pressure fluid 74, and other forms of sealing and gripping elements 19 and 34. For example, instead of using a pump or a reservoir of pressure fluid 74, the pistons 55 and 56 may be actuated by utilizing the high pressure fluid from the well head 10 which would be controlled by suitable valve means similar to valve 72. If the casing head pressure is used to reciprocate pistons 55 and 56, it is essential that the total piston area be greater than the cross-sectional area of the traveling barrel 27. It is also desirable, in all embodiments, that the pressure developed by pump 43 be great enough to supply fluid to chambers 17 and 32 at a pressure higher than the casing head pressure to prevent said pressure from escaping around said tubing while it is being inserted.

It may also be seen that instead of using a single pump 43, a pair of pumps may be employed, one to deliver a pressure fluid to the packers 19 and 34 and the other to deliver a pressure fluid to the pistons 55 and 56. Also the packers 19 and 34 may be actuated by a pressure fluid while the traveling barrel 27 may be reciprocated by any suitable electrical, mechanical or hydraulic means well known to the art.

Another embodiment of a gripping element is shown in Figure 2 as being secured to the top of the traveling barrel 27. This embodiment comprises plate members 101, 102, 103 and 104 rigidly secured together by tubular members 105 and 106 which are adapted to receive tubular rubber grippers 107 and 108. The plate members 101, 102, 103 and 104 have co-axial bores therethrough to accommodate a cable 109. The grippers 107 and 108 have outer diameters smaller than the inner diameters of the tubular members 105 and 106 whereby annular chambers 110 and 111 are formed therebetween. The ends of the grippers 107 and 108 are preferably concave to fit the adjacent convex surfaces of plate members 101, 102, 103 and 104 and thus form a more effective seal against the pressure fluid. Chambers 110 and 111 communicate through fluid inlets 112 and 113 and conduits 114, 115 and 116 with a common source of pressure fluid (not shown).

When an uncovered wire cable, formed from a number of wires of smaller diameter twisted together, passes through rubber grippers, the grooves between the wires on the surface of the cable are sometimes of sufficient size to permit the escape of well fluid along the cable even with the gripper compressed against the cable. To block this means of escape of well fluid, the grooves in the surface of the cable may be filled, prior to its insertion into a well, with any suitable filler such, for example, as wax, grease, a plastic material, paint, or the like. The preferred method is to apply a grease to the surface of the cable 109 to fill the grooves thereon. For this purpose an annular lubricating channel 117 is cut in one of the plate members 102 between the two grippers 107 and 108. The channel 117 communicates through an inlet port 118 with a conduit 119 or any other means for supplying grease thereto, said grease being preferably under pressure. Thus, the grooves in the surface of the cable 109 are filled before the cable enters the lower gripper 108. The above-described gripping element is normally operated in a manner similar to gripping element 34 of Figure 1.

I claim as my invention:

1. An apparatus for forcing a relatively flexible columnar element through an orifice in a pressure vessel, comprising a stationary sealing member affixed to said vessel over said orifice, a movable cylindrical sealing member disposed for coaxial sliding movement therewith, packing means mounted within each sealing member, an axial passage through said sealing members and the packing means therein in register with said orifice, said axial passage being adapted to receive said columnar element, prime-mover means in engagement with said movable sealing member for reciprocating said member in the direction of said axial passage, and means comprising pressure fluid inlet means in communication with the sealing members for selectively and alternately applying a fluid pressure to the packing means therein, whereby a fluid-tight grip is selectively and alternately applied to said columnar element by said packing means.

2. An apparatus for forcing a relatively flexible columnar element through an orifice in a pressure vessel, comprising a stationary plunger affixed to said vessel over said orifice, a stationary sealing member carried by said plunger, a cylinder adapted for sliding axial motion over said plunger, a movable sealing member carried by said cylinder, a chamber within each sealing member, packing means within each chamber, a passage co-axial with said plunger and cylinder through the sealing members and the packing means therein, said passage being adapted to receive said columnar element, pressure fluid actuated reciprocating prime-mover means, linkage means connecting said prime-mover means to said cylinder, means comprising inlet means to the chambers within said sealing members for applying a fluid pressure to the packing means therein, whereby a tight grip is applied to said columnar element by said packing means, a source of pressure fluid, and valve means for selectively synchronizing the admission of the pressure fluid to the prime-mover means on the operative stroke thereof with the admission of the pressure fluid to the chambers in the movable sealing member and in the stationary sealing member.

3. An apparatus for forcing a relatively flexible columnar element through an orifice in a pressure vessel, comprising a stationary plunger affixed to said vessel over said orifice, a stationary sealing member axially carried by said plunger, a cylinder adapted for reciprocating motion over said plunger in a fluid-tight manner, a sealing member closing one end of said cylinder, and movable therewith, a chamber within each sealing member, packing means centrally positioned within each chamber, a passage co-axial with said plunger and cylinder through the sealing members and the packing means therein, said passage being adapted to receive said columnar element, pressure fluid actuated reciprocating prime-mover means, linkage means connecting said prime-mover means to said cylinder, means comprising inlet means to the chambers within said sealing members for applying a fluid pressure to the packing means therein, whereby a tight grip is applied to said columnar element by said packing means and the passage through said sealing means is closed, a source of pressure fluid, and valve means for selectively synchronizing the admission of the pressure fluid to the chambers in the movable sealing member and in the stationary sealing member.

4. An apparatus for forcing a relatively flexible columnar element through an orifice in a pressure vessel, comprising a stationary plunger affixed to said vessel over said orifice, a stationary sealing member axially carried by said plunger, a cylinder adapted for reciprocating motion over said plunger in a fluid-tight manner, a movable sealing member axially carried by said cylinder, a chamber within each sealing member, packing means centrally positioned within each chamber forming an annular space between said packing means and the chamber wall, a passage co-axial with said plunger and cylinder through the sealing members and the packing means therein, said passage being adapted to receive said columnar element, pressure fluid actuated reciprocating prime-mover means, linkage means connecting said prime-mover means to said cylinder, means comprising inlet means to the annular spaces within said sealing members for applying a fluid pressure in a radial direction to the packing means therein, whereby a tight grip is applied to said columnar element by said packing means and the passageway through said sealing means is closed, a source of pressure fluid, valve means for selectively synchronizing the admission of the pressure fluid to the prime-mover means on an operative stroke thereof with the selective admission of the pressure fluid alternately to the annular spaces in the movable sealing member and the stationary sealing member, and valve means for selectively and alternately relieving the annular spaces in the stationary and the movable sealing means of the pressure applied thereto.

5. An apparatus for forcing a relatively flexible columnar element through an orifice in a pressure vessel, comprising a stationary plunger affixed to said vessel over said orifice, a stationary sealing member carried by said plunger, a cylinder adapted for reciprocating motion over said plunger in a fluid-tight manner, a movable sealing member carried by said cylinder, a chamber within each sealing member, resilient packing means centrally positioned within each chamber forming an annular space between said packing means and the chamber wall, a passage co-axial with said plunger and cylinder through the sealing members and the packing means therein, said passage being adapted to receive said columnar element, reciprocating prime-mover means, linkage means connecting said prime-mover means to said cylinder, means comprising inlet means to the annular spaces within said sealing members for applying a fluid pressure in a radial direction to the packing means therein, whereby a tight grip is applied to said columnar element by said packing means and the passageway through said sealing means is closed, a source of pressure fluid, valve means for selectively synchronizing the admission of the pressure fluid to the annular spaces in first the movable sealing member on the down-stroke of said prime-mover means and then in the stationary sealing member on the upstroke of said prime-mover means, and valve means for selectively and alternately relieving the annular spaces in the stationary sealing means and the movable sealing means of the pressure applied thereto.

HOWARD E. McKINNEY.

REFERENCES CITED

The following references are of record in the file of this patent:

UNITED STATES PATENTS

| Number | Name | Date |
| --- | --- | --- |
| 1,117,516 | Petrie | Nov. 17, 1914 |
| 1,120,741 | Petrie | Dec. 15, 1914 |
| 1,231,014 | Goodwill | June 26, 1917 |